(12) United States Patent
Seol et al.

(10) Patent No.: US 11,631,064 B2
(45) Date of Patent: Apr. 18, 2023

(54) CROWDFUNDING METHOD BASED ON BLOCK CHAIN FOR CREATING GAME AND CROWDFUNDING SYSTEM FOR IMPLEMENTING CROWDFUNDING SERVICE ENVIRONMENT

(71) Applicant: NHN Corporation, Gyeonggi-do (KR)

(72) Inventors: Soo Kyoung Seol, Gyeonggi-do (KR); Heetae Lyu, Gyeonggi-do (KR); Junghwa Baek, Gyeonggi-do (KR); Kiho Na, Gyeonggi-do (KR); HeeJae Myeong, Gyeonggi-do (KR); Min Tae Kim, Gyeonggi-do (KR); SeungJae Lee, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 475 days.

(21) Appl. No.: 16/572,606

(22) Filed: Sep. 17, 2019

(65) Prior Publication Data
US 2020/0090140 A1 Mar. 19, 2020

(30) Foreign Application Priority Data
Sep. 17, 2018 (KR) .................. 10-2018-0110869

(51) Int. Cl.
*G06Q 20/06* (2012.01)
*G07C 13/00* (2006.01)
*G06Q 50/00* (2012.01)

(52) U.S. Cl.
CPC .......... *G06Q 20/065* (2013.01); *G06Q 50/01* (2013.01); *G07C 13/00* (2013.01); *G06Q 2230/00* (2013.01)

(58) Field of Classification Search
CPC .. G06Q 20/065; G06Q 50/01; G06Q 2230/00; G07C 13/00
See application file for complete search history.

(56) References Cited

U.S. PATENT DOCUMENTS

2007/0100729 A1* 5/2007 Chen .................. G06Q 30/06
705/36 R
2007/0117601 A1* 5/2007 Van Luchene ......... G06Q 30/04
463/1

(Continued)

FOREIGN PATENT DOCUMENTS

KR         10-1705948         2/2017
KR      10-2017-0112332      10/2017

(Continued)

OTHER PUBLICATIONS

Andreas M. Antonopoulos, Mastering Bitcoin, Dec. 2014, O'Reilly Media, p. 182 (Year: 2014).*

(Continued)

*Primary Examiner* — Neha Patel
*Assistant Examiner* — Nilesh B Khatri
(74) *Attorney, Agent, or Firm* — Ladas & Parry, LLP (57) ABSTRACT

A crowdfunding method may be executed by one or more processors of a crowdfunding system based on a blockchain for creating a game operating on a distributed network composed of a plurality of nodes. The method comprises performing a crowdfunding service on the distributed network according to a configured smart contract. The smart contract comprises generating an initial block including data records related to game production plan information, sharing at least one transaction record related to electronic transactions of coins with the plurality of nodes, generating at least one new block including data records related to at least one transaction record, and updating a blockchain stored in at least one of the plurality of nodes so as to add the new block to the blockchain through communication with the distributed network.

18 Claims, 5 Drawing Sheets

(56) References Cited

U.S. PATENT DOCUMENTS

| | | | |
|---|---|---|---|
| 2016/0274904 A1* | 9/2016 | Niazi | G06F 8/71 |
| 2018/0025442 A1* | 1/2018 | Isaacson | G06Q 50/01 |
| | | | 705/26.62 |
| 2018/0218176 A1* | 8/2018 | Voorhees | H04L 9/3213 |
| 2018/0276626 A1* | 9/2018 | Laiben | H04L 9/3239 |
| 2020/0167344 A1* | 5/2020 | Ye | G06F 3/067 |
| 2022/0058614 A1 | 2/2022 | Savanah et al. | |

FOREIGN PATENT DOCUMENTS

| | | | | |
|---|---|---|---|---|
| KR | 10-2018-0014534 | | 2/2018 | |
| WO | 2018/020389 | | 2/2018 | |
| WO | WO-2019127532 A1 * | 7/2019 | | G06Q 20/3825 |

OTHER PUBLICATIONS

Kaiwen Zhang et al., Towards Dependable, Scalable, and Pervasive Distributed Ledgers with Blockchains, Jul. 1, 2018, IEEE, pp. 1337-1346 (Year: 2018).*

Notice of Allowance dated Oct. 8, 2020 for Korean Patent Application No. 10-2018-0110869 and its English machine translation from Global Dossier.

Office Action dated Mar. 3, 2020 for Korean Patent Application No. 10-2018-0110869 and its English machine translation from Global Dossier.

Jason Kim: "Ethereum, DAICO New Token Sale Model and Precautions of Implementation", (medium.com), Mar. 11, 2018.

\* cited by examiner

CROWDFUNDING METHOD BASED ON BLOCK CHAIN FOR CREATING GAME AND CROWDFUNDING SYSTEM FOR IMPLEMENTING CROWDFUNDING SERVICE ENVIRONMENT

CROSS REFERENCE TO RELATED APPLICATION(S)

This application claims the priority to Korean Patent Application No. 10-2018-0110869, filed on Sep. 17, 2018, which is all hereby incorporated by reference in its entirety.

BACKGROUND

Technical Field

The present disclosure generally relates to a method for providing a crowdfunding service environment based on a blockchain for creating and/or operating a game and a system for implementing the crowdfunding service environment.

Related Art

Recently, crowdfunding is getting great attention, which raises small amounts of money from the public. Crowdfunding may refer to a method of raising funds from a large number of individuals via Social Network Service (SNS) or Internet sites to collect money required not only for artistic and cultural projects such as movies or plays but also for small and medium enterprises. The crowdfunding is composed of a project owner who is an individual or a company with a specific goal, investors, and a crowdfunding platform which acts as a moderator. The crowdfunding manifests itself in that a large number of individuals support a specific project by providing small amounts of money, and various business areas and ideas may be funded from the crowdfunding, which are otherwise limited in the conventional fundraising methods.

However, a negative perception of the crowdfunding is also gradually increasing. For example, the number of so called take-the-money-and-run cases is gradually growing. Examples of the take-the-money-and-run, include a case where a development project, which has succeeded in securing the project fund in the early stage of fundraising and far beyond the target amount of crowdfunding, ends in the project with low quality far below the expectations; a case where project release is delayed as payment to a project distributer is not duly executed; a case where a person responsible for raising funds simply disappears after collecting money from crowdfunding; a case of giving up all the proprietary rights to another company in the middle of project development due to lack of capabilities; and a case where the project development itself is very sluggish. As the failure cases are accumulated, a negative perception on the crowdfunding is being spread, and therefore, a need for technology capable of ensuring reliability of the crowdfunding is growing.

It is with respect to these and other general considerations that the following embodiments have been described. Also, although relatively specific problems have been discussed, it should be understood that the embodiments should not be limited to solving the specific problems identified in the background.

PRIOR ART REFERENCES

Patents (Patent 001) Korean Patent Application Publication No. 10-2017-0112332

SUMMARY

Various embodiments of the present disclosure may provide a system capable of ensuring reliability of producing games using crowdfunding and blockchain technology.

Some embodiments of the present disclosure may provide a method for providing a crowdfunding service environment based on a blockchain for creating, producing and/or operating a game and a system for implementing the crowdfunding service environment.

Certain embodiments of the present disclosure may provide a system capable of ensuring reliability, transparency, and appropriateness in using investment money for game production and distribution of profits from the produced game service.

According to an embodiment of the present invention, a crowdfunding method executed by a processor of a crowdfunding system based on a blockchain for creating a game operating on a distributed network composed of a plurality of nodes may comprise performing a crowdfunding service on the distributed network according to a configured smart contract, wherein the smart contract comprises generating an initial block including data records related to game production plan information, sharing at least one transaction record related to electronic transactions of coins among the plurality of nodes, generating at least one new block including data records related to the at least one transaction record, and updating a blockchain stored in at least one of the plurality of nodes so as to include the new block based on communication with the distributed network.

According to a different aspect of the method, the game production plan information may include at least one of game concept information, fundraising plan information, use plan information of raised funds, and step-by-step contract information received from a game producer via a webpage provided by a crowdfunding node among the plurality of nodes.

According to a different aspect of the method, the crowdfunding node may generate a crowdfunding game promotion page based on the game production plan information, and rights for browsing the game promotion page may be provided to all of the nodes connected to the crowdfunding node.

According to a different aspect of the method, the plurality of nodes may include a crowdfunding node, investor node, and developer node; and the transaction records may include first transaction records about transfer of coins from the investor node for funding to the crowdfunding node.

According to a different aspect of the method, a node which has received the first transaction records may validate the received first transaction records, share the first transaction records with other nodes if validated, discard the corresponding transaction records otherwise, where validation of the first transaction records includes at least one of validation of syntax of the corresponding transaction and data structure, validation of whether the minimum amount of investment is satisfied for each investor, validation of whether the amount of investment of each investor is less than the maximum amount of investment, and validation of whether the remittance date is within a fundraising period.

According to a different aspect of the method, the smart contract may determine priority of the first transaction records based on the amount of remittance of coins within the first transaction records shared among a plurality of nodes and include a transaction record of high priority in the new block.

According to a different aspect of the method, the transaction record may further include a second transaction record about remittance of coins to the developer node from the crowdfunding node for using funded coins.

According to a different aspect of the method, the transaction record may further include a third transaction record about remittance of coins to the developer node and to the investor node from the crowdfunding node for distributing profits from service of a produced game.

According to a different aspect of the method, each of the first to the third transaction record may be generated during a different time period not overlapped with each other.

According to a different aspect of the method, the smart contract is configured based on the game production plan information.

According to a different aspect of the method, the smart contract may determine generation time of the new block based on at least one of information about the number of transaction records, information about the amount of coins on the transaction records, and information about generation time of the transaction records.

According to a different aspect of the method, the game production plan information may include information related to step-by-step contract conditions, and the smart contract may determine whether to generate the new block based on whether the contract conditions are fulfilled at the respective steps.

According to a different aspect of the method, the plurality of nodes may include a crowdfunding node, investor node, and developer node; and the smart contract may determine whether to generate the new block including a transaction record where at least part of coins received from the investor node by the crowdfunding is transferred to the developer node based on execution of the step-by-step contract conditions.

According to a different aspect of the method, the smart contract may include collecting online voting results from predetermined nodes among the plurality of nodes and determining whether to execute the step-by-step contract conditions based on the online voting results.

According to a different aspect of the method, the predetermined nodes are the nodes which have funded coins more than a preconfigured amount.

According to a different aspect of the method, the smart contract may generate a new transaction record based on at least one of sales information due to service of a game completely produced, advertisement information about a game service, information about the amount of coins on a transaction record between a crowdfunding node and an investor node, and generation time of a transaction record between the crowdfunding node and the investor node.

According to a different aspect of the method, the new transaction record may include at least one of at least one transaction record about remittance of coins to a developer node, at least one transaction record about remittance of coins to the developer node, and at least one transaction record about remittance of coins to the crowdfunding node.

According to a different aspect of the method, the smart contract may determine a node to be granted a right for generating a new block to include the transaction record based on sales information due to service of a game completely produced, advertisement information about a game service, information about the amount of coins on a transaction record between a crowdfunding node and an investor node, generation time of a transaction record between the crowdfunding node and the investor node, and information about nodes which have participated in online voting.

According to a different aspect of the method, a node which has received transaction records may validate the received transaction records, share the transaction records with other nodes if validated, discard the corresponding transaction records otherwise, where validation of transaction records includes at least one of validation of syntax of the corresponding transaction and data structure, validation of whether the amount of remittance is within a predetermined reference amount of remittance, and validation of whether the remittance date is within a predetermined period.

According to yet another aspect of the method, in a computer program stored in a non-volatile computer-readable medium, including commands executable by at least one processor of at least one node of a crowdfunding system based on a blockchain for creating a game operating on a distributed network composed of a plurality of nodes, the commands may include performing a crowdfunding service on the distributed network according to a configured smart contract, wherein the smart contract comprises generating an initial block including data records related to game production plan information, sharing at least one transaction record related to electronic transactions of coins among the plurality of nodes, generating at least one new block including data records related to the at least one transaction record, and updating a blockchain stored in at least one of the plurality of nodes so as to include the new block based on communication with the distributed network.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DESCRIPTION OF EXEMPLARY EMBODIMENTS

Since the present invention may be modified in various ways and may provide various embodiments, specific embodiments will be depicted in the appended drawings and described in detail with reference to the drawings. The effects and characteristics of the present invention and a method for achieving them will be clearly understood by referring to the embodiments described later in detail together with the appended drawings. However, it should be noted that the present invention is not limited to the embodiment disclosed below but may be implemented in various forms. In the following embodiments, the terms such as first and second are introduced to distinguish one element from the others, and thus the technical scope of the present invention should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present invention is not necessarily limited to what has been shown in the figure.

In what follows, various embodiments of the present disclosure will be described in detail with reference to appended drawings. Throughout the specification, the same or corresponding constituting element is assigned the same reference number, and repeated descriptions thereof will be omitted.

Figure 1:
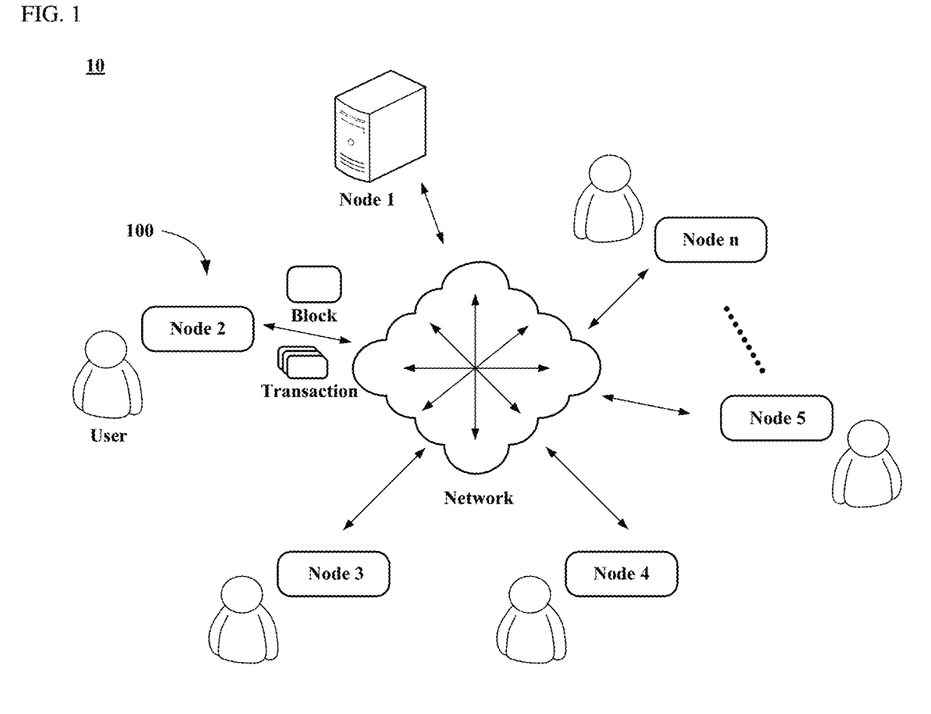
FIGS. 1 and 2 illustrate conceptual diagrams of a crowdfunding system in which nodes within a crowdfunding network are structured or programmed to manage a crowdfunding service in the form of a crowdfunding blockchain according to embodiments of the present disclosure.
Figure 2:
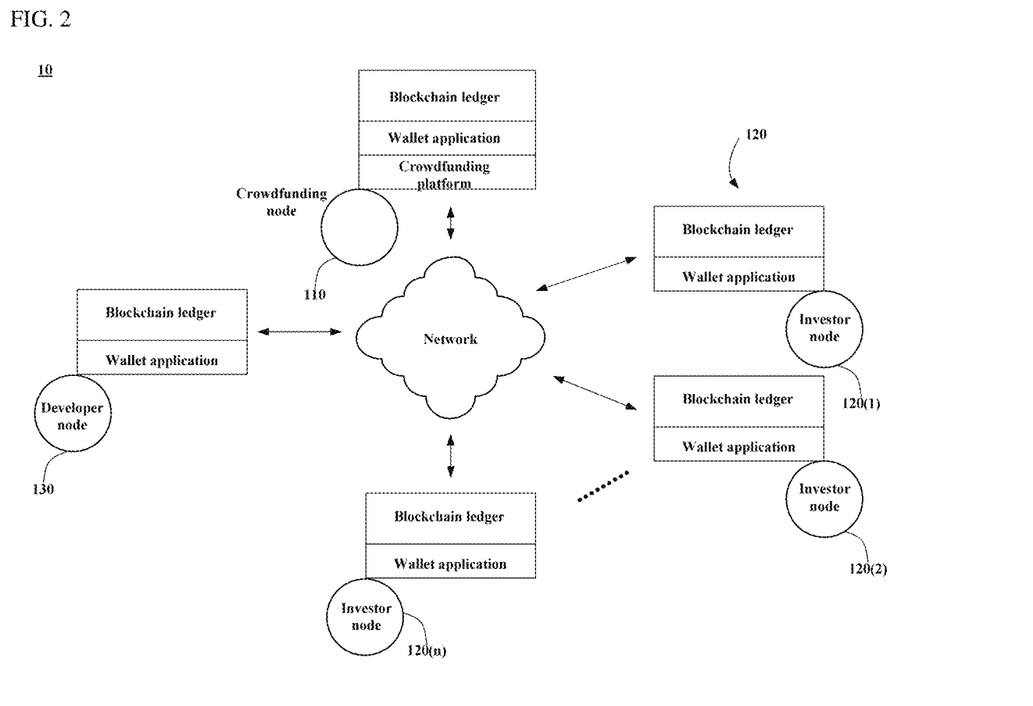
Figure 3:
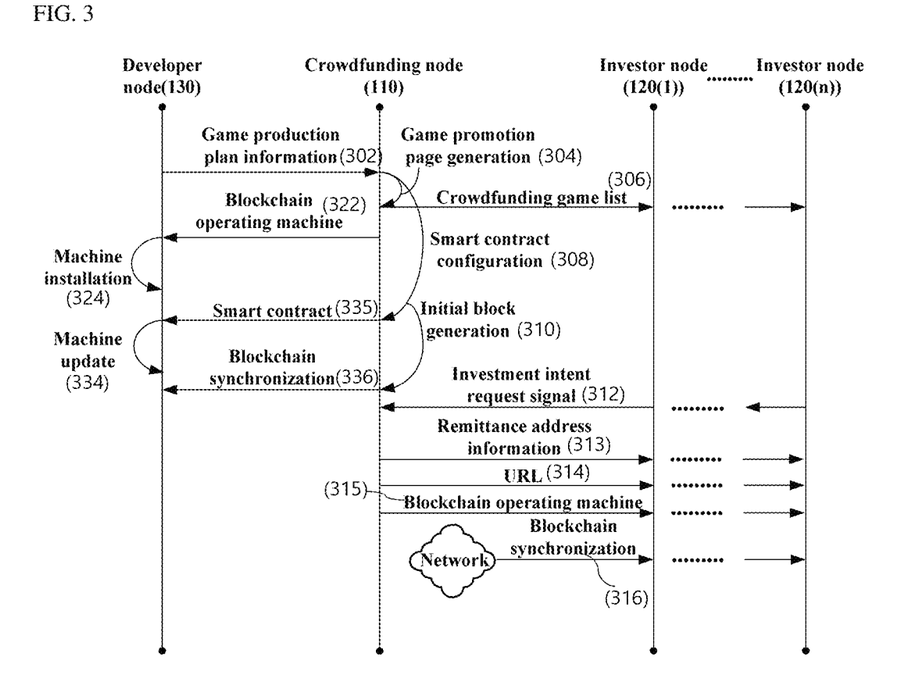
FIGS. 3 to 5 are flow diagrams illustrating a method for operating a crowdfunding system based on a blockchain for producing a game according to embodiments of the present disclosure.
Figure 4:
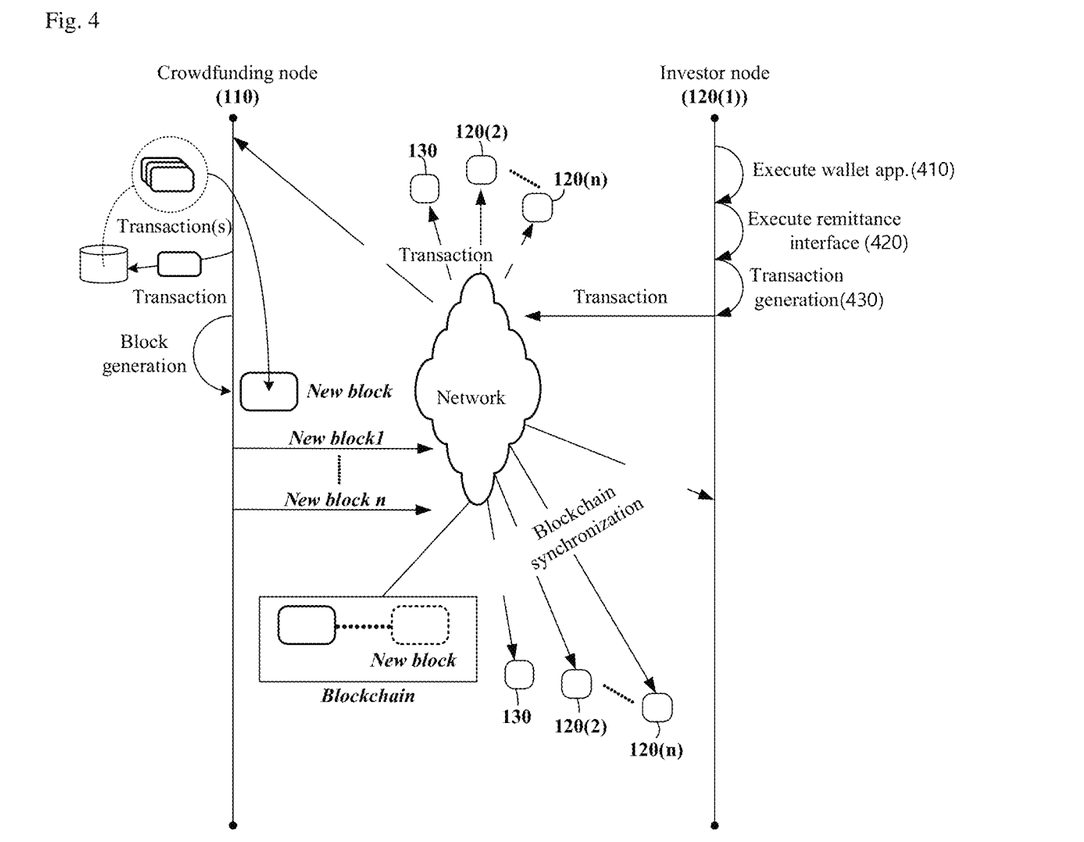
Figure 5:
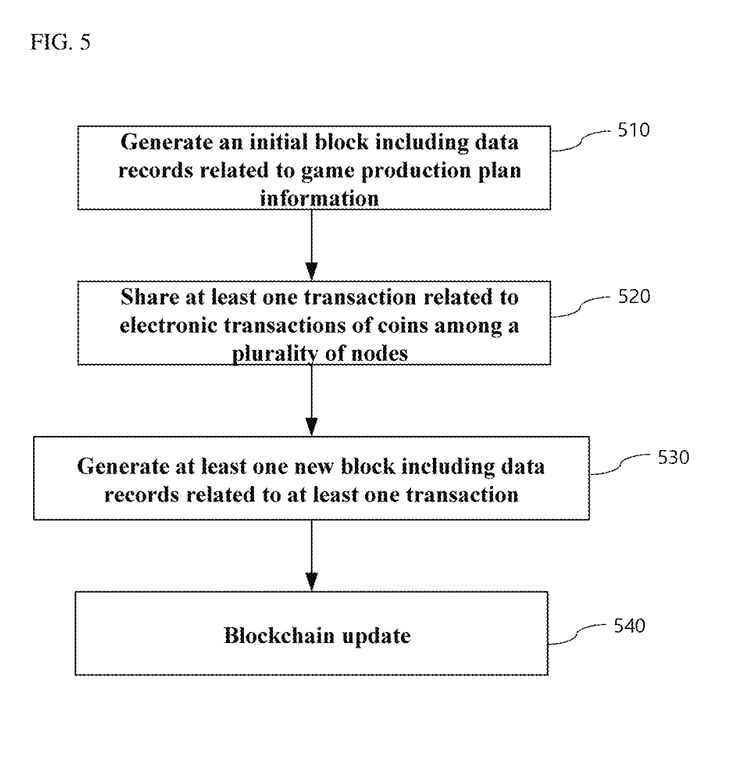

FIGS. 1 and 2 illustrate conceptual diagrams of a crowdfunding system in which nodes within a crowdfunding network are structured or programmed to manage a crowdfunding service in the form of a crowdfunding blockchain according to embodiments of the present disclosure. And FIGS. 3 to 5 are flow diagrams illustrating a method for operating a crowdfunding system based on a blockchain for creating a game according to embodiments of the present disclosure.

Some embodiments of the system described below may be implemented as a crowdfunding system based on a blockchain for creating a game. And, certain embodiments of the present disclosure may be related to a crowdfunding method executed by one or more processors of the crowdfunding system.

The crowdfunding system may be built on, for example, but not limited to, a peer-to-peer network architecture. For instance, users participating in the system may be all given equal positions, no special node is designated in the network, and all of the nodes (node 1 to node n) share the role of providing a network service. Nodes 100 on the network may form topologies equivalent to each other and may be interconnected in a mesh network. Even if the nodes belonging to the network are at the positions equal to each other, their roles may differ from each other depending on the function supported by the nodes.

Each node is equipped with a routing function within the network and may be equipped with other function. Each node validates and propagates transactions and blocks, and may perform the role of maintaining a connection to neighboring nodes.

A user may play the role of a game developer, crowd service manager, or investor. Each developer, manager, or investor may be an individual, organization, community, or any type of entity.

The nodes 100 connected to the network may include a crowdfunding node 110, investor nodes (120(1) to 120(n)), and a developer node 130. However, the network may further include those nodes operating a special protocol and a protocol gateway that connect nodes operating other protocols as well as the crowdfunding node 110, the investor nodes (120(1) to 120(n)), and the developer node 130 to each other.

To participate in the crowdfunding service, a new node may first search for other nodes existing or connected on the network. To start this process, the new node may have to search for at least one node pre-existing or connected on the network. For the new node to be connected to a neighboring node already known or connected, each of the nodes may form a TCP connection to the port of a particular number or to an alternative port.

The new node may transmit a connection request message to a neighboring node, and the neighboring node may transmit an approval message to the new node in response to the connection request message if the neighboring node accepts the new node's connection request. As an example, if a new node is a developer node 130, there may be no investor node on the network, and therefore, a neighboring node may become the crowdfunding node 110. In another example, if a new node is an investor node 120, the neighboring node may become another investor node, which has already participated in the network, or developer node 130 or crowdfunding node 110.

After one or more connections have been established, the new node may transmit an address message containing its IP address to its neighboring node(s). Subsequently, the neighboring node(s) received the IP address may transmit the received address message to their neighboring nodes, and thereby the newly connected node becomes better known and better connected to other nodes. Also, the newly connected node may request its neighboring node(s) to transmit a list of IP addresses of the other neighboring nodes again by transmitting an address request message to its neighboring node(s). Through the aforementioned operation, a node may search for its neighboring nodes connected thereto and broadcast its presence on the network so that other nodes may search for the node itself.

The crowdfunding node 110 may have a copy of a whole blockchain. And, the investor node 120 and developer node 130 may have a copy of the whole blockchain or at least a copy corresponding to a subset of the blockchain. For example, the blockchain is realized by a distributed computer system comprising unalterable blocks of transactions. Since each block constituting a blockchain contains a hash of its previous block, blocks are connected altogether and generate records of all transactions initially written to the blockchain. Since a block is tied to previous or other blocks, disassembly, modification, and reconfiguration of the records may be almost impossible and prevented. Additionally, because blocks are possessed by nodes, the blocks may be distributed and robust. In some embodiments, one block records at least one transaction. Transactions are hashed and configured so that forgery or falsification may be prevented from being occurred. Each block and transaction may prevent forgery or falsification by managing hash values and timestamps at the time of data generation and tracking a history of transactions. Also, the nodes 100 may store a blockchain ledger and wallet application, by which a user may perform transactions and other related functions through the network in a secure and reliable manner.

Nodes may provide a blockchain explorer. The blockchain explorer may be implemented by, for instance, but not limited to, a web-application which performs the role of a coin search engine. A user possessing a wallet may look up the coin address, transaction records, or blocks through the blockchain explorer and figure out a relationship and flow among them.

Each node may include a server, interface, system, database, agent, peer, engine, controller, or any other type of a computing device operating individually or in a group or may be constructed in an appropriate combination of computing devices that can read or process all kinds of computing languages or instructions. The computing device may include a processor configured to execute software commands stored in a non-volatile computer-readable storage medium (for example, a hard drive, solid state drive, RAM, flash, and ROM). Preferably, the software commands are organized so that the computing device may provide various functions described later. Also, the disclosed techniques may be implemented as a computer program product which includes a non-volatile computer-readable medium storing software commands used by the processor to execute disclosed steps or instructions. Preferably, various servers, systems, databases, and interfaces may exchange data by using HTTP, HTTPS, AES, public/private key exchange, web service, API, financial transaction protocol known to the public, or other electronic standard protocol or algorithm. Preferably, data exchange may be performed through a packet exchange network, Internet, LAN, WAN, VPN, or any other type of packet exchange network.

It should be understood that the disclosed technique may provide various advantageous technical effects including constructing and storing a blockchain representing transactions of a game developer or investor. Through the construction and storing of a blockchain for a crowdfunding service 10 for creating a game, a computing device may verify the relevancy of the game production process and the use of invested money promptly and efficiently and may expect the appropriate and fair distribution of profits due to the game service.

The crowdfunding node 110 may include a crowdfunding platform hosted by a computing device expressed as the crowdfunding node 110. In some embodiments, the platform may be a web-based or cloud-based platform that may be accessed through the network by a computing device operated by a user such as a manager of the crowdfunding node, game developer, or investor. The crowdfunding node may provide a web page that provides an interface function for developers to collect game production plan information.

A developer may access the web page that the crowdfunding node 110 provides through the developer's computing device and input game production plan information on the web page (302).

The game production plan information may include game concept information, fundraising plan information, use plan information of raised funds, compensation plan information, and step-by-step contract information.

More specifically, the game concept information may include game plan information such as game idea information, information about elements of game, information about expected target users, platform information, and game promotion plan information. The fundraising plan information may include target amount information, fundraising period information, additional fundraising period information due to insufficient collection of funds below the target amount within the fundraising period, information about the minimum amount of investment for each investor, and information about the maximum amount of investment for each investor. The use plan information may include information about the use plan for the investment within the target amount and information about the use plan for the investment which exceeds the target amount. The compensation plan information may include compensation ratio information due to profits and non-monetary benefit information.

Also, the developer may access the crowdfunding node 110, download a blockchain operating machine provided by the crowdfunding node 110 (322), and install the download blockchain operating machine to its computing device (324). In some embodiments, the blockchain operating machine may be coin core software. The developer may access the crowdfunding node 110 and download the corresponding blockchain operating machine. In some embodiments, the blockchain operating machine may include all of the elements for operating a blockchain. In some embodiments, the blockchain operating machine may include only part or some of the constituting elements for operating a blockchain while the remaining constituting elements may be added through an update mechanism. In some embodiments, part of the elements of the blockchain operating machine may be modified or changed through a software update mechanism. Since the crowdfunding node 110 is capable of providing various versions of blockchain operating machines suitable for the characteristics of the operating system of each developer or investor node, a user of a node may download a blockchain operating machine suitable for the operating system of the user's node and install the downloaded blockchain operating machine to the user's node the same way other operating systems execute applications.

In some embodiments, according to a configured smart contract, a crowdfunding service may be performed on a distributed network. A computer program, which is stored in a non-volatile computer-readable medium including commands executable by at least one processor of at least one node of the crowdfunding system based on a blockchain for creating a game operating on a distributed network composed of or comprising a plurality of nodes, may act as a blockchain operating machine. Here, the commands may include performing a crowdfunding service on a distributed network according to the configured smart contract.

In some embodiments, at least part of a smart contract is configured based on the game production plan information to be described later, and a blockchain system may be made to be operated according to the smart contract. Therefore, the smart contract suitable for a game to be produced may be configured based on the genre of the game to be produced, the type of the game, or the game production plan of the developer. Therefore, a crowdfunding service customized to the user is made available by operating the blockchain system according to the configured smart contract.

More specifically, when a blockchain operating machine is installed and executed, the pre-installed blockchain operating machine may be updated as an update program is downloaded and installed to the crowdfunding node 110 (334). Here, update specifics may include a smart contract related to crowd fundraising, investment, profit sharing, and blockchain operation method. If the blockchain operating machine is updated, the blockchain system may be operated according to the smart contract. If the blockchain operating machine is updated, the blockchain system may be operated according to the smart contract (335).

In some embodiments, a smart contract is implemented as a digital command recorded in a block, and as the block recording the smart contract is shared across the entire nodes, the smart contract may be stored in a blockchain. And, all of the nodes execute the codes of the smart contract on the corresponding block, automatically execute the content of the contract, and thereby enable a main service to be operated.

The smart contract is a kind of contract describing contracts about funding, used of funds, distribution of profits, and blockchain operation method, and scripts describing the contract may be automatically performed on the network in a distributed manner. The updated blockchain operating machine makes a blockchain service operated according to the smart contract by interpreting and executing the codes related to the smart contract.

Also, a blockchain begins to be downloaded as the blockchain operating machine is executed. According to the download time of the blockchain, the blockchain operating machine may be executed in the background until it transitions from an out-of-sync state to a synchronized state.

The crowdfunding node 110 may generates a crowdfunding game promotion page based on game production plan information (304). And, the crowdfunding node 110 may update a list of crowdfunding games by adding the generated crowdfunding game promotion page to the list of crowdfunding games (306). And, the crowdfunding node 110 may post the list of crowdfunding games on its website, thereby allowing all the users accessing the website through the network to look up the list. According to another aspect, the crowdfunding node 110 may post the list of crowdfunding games on its website, thereby providing rights for looking up the information to the node which has accessed the website through the network.

The crowdfunding node 110 may configure the smart contract based on the game production plan information (308). The blockchain operating machine installed to each node is updated so that the blockchain may be operated according to the configured smart contract. And the updated blockchain operating machine allows the blockchain system to be operated according to the configured smart contract. In other words, a workflow may be determined according to the smart contract residing on the blockchain.

The smart contract may include one or more rules about automatic generation of blocks, block generation rights, and block generation time.

The crowdfunding node 110 may generate an initial block including the input game production plan information (310, 510).

The initial block may include all of the game production plan information. In other words, the initial block may include all of the information about the game production plan described by the developer on the webpage provided by the crowdfunding node 110. And, the initial block may include summary information that summarizes the game production plan information and the Uniform Resource Location (URL) of the webpage from which the original of the game production plan information may be checked. A node which has received the initial block may check the summary information recorded on the initial block or check the whole content of the game production plan information through the URL.

If an initial block is generated at the crowdfunding node 110, the blockchain operating machine of each node may download a newly added block through a synchronization process (336). For example, the developer node 130 receives the generated initial block from the network. In some embodiments, if the received initial block is checked for validity and determined as valid, the developer node 130 stores the initial block in the memory.

People interested in investing in game production may access the website of the crowdfunding node 110 and browse at least one game content in the list of crowdfunding games.

The crowdfunding node 110 may provide a webpage to the investor node 120 that wants to invest funds to a particular game. The webpage provides an interface function for investors.

The investor transmits an investment intent request signal for a particular game through the webpage (312).

The crowdfunding node 110 may transmit remittance address information of the crowdfunding node 110 (313) and may transmit a webpage including the URL for downloading of the blockchain operating machine to the investor node 120 in response to the investment intent request signal (314). The remittance address information of the crowdfunding node 110 on the webpage is used for transmission of coins to the crowdfunding node 110. And, the investor may download the blockchain operating machine through the URL on the webpage and install the downloaded blockchain operating machine on the investor's node (315). In some embodiments, the blockchain operating machine may be the program to which the smart contract has been applied. Meanwhile, the currency unit named as coin is used to store and transmit values among participants on the network.

The blockchain operating machine installed on the investor node 120 downloads a blockchain and synchronizes to the blockchain (316). In some embodiments, the size of the blockchain to be synchronized with the investor node 120 may be too large, and the synchronization with the blockchain may not be completed until the end of the fundraising period. In this case, a separate, additional node may generate coin remittance transactions for investment to the crowdfunding node 110. When the transaction generated at or by the additional node is included in a new block, the transaction is converted to coin remittance to the crowdfunding node 110 from a node with the IP address designated by the investor (the investor node in the middle of blockchain synchronization) at the time of generating the transaction, which may be included in the new block. In some embodiments, the additional node may be a node that the crowdfunding node 110 provides.

The investor may execute a wallet application from the investor's computing device to participate in the crowdfunding (410).

The wallet application executed in the computing device corresponding to the investor node 120 may display or provide an interface for remittance (420).

The investor may input remittance address information of the crowdfunding node 110 and the amount of coin remittance through the interface for remittance and generate a transaction for transmitting the corresponding coin to the crowdfunding node 110 (430). In some embodiments, the investor may scan a remittance identification code of the crowdfunding node 110 by using a scanner, a camera or an image capturing device, which is an auxiliary device of the computing device. The computing device converts the information of the identification code read through the scanner to the remittance address information. And the computing device automatically inputs the remittance address information to the input block for remittance address information of the interface for remittance. In some embodiments, if the investor node 120 is implemented as a wearable computing device, the remittance identification code may be scanned through a camera device installed in the wearable computing device or a camera device operably connected with the wearable computing device.

The crowdfunding node 110 may receive a coin corresponding to the investment from a plurality of investor nodes (120(1) to 120(n)) according to a value transmission scheme. In some embodiments, the crowdfunding node 110 may receive coins from the investor nodes only during the fundraising period.

When a transaction transferring coins from the investor node 120 to the crowdfunding node 110 is established, the coins contained in the wallet of the investor node 120 are deducted, and the investor may digitally sign the corresponding transaction by using a private key. When the signature is completed, it is broadcast over the network that coin remittance from the investor node 120 to the crowdfunding node 110 has been approved. The transaction may be performed through the P2P protocol, and therefore the corresponding transaction may be transferred quickly to the network, and most of the nodes connected to the network may receive the transaction details within a few seconds.

If a transaction is transferred to one particular node connected to the network, the transaction is validated by the corresponding node. Once the transaction is validated, the transaction is propagated to other nodes connected to the corresponding node, and a success message may be transmitted to the generator simultaneously. If the transaction is invalidated, the corresponding node refuses to approve the transaction, and at the same time, a rejection message may be sent to the generator. Each node performs a validation process to validate the corresponding transaction. For example, each node may perform the validation of syntax of the corresponding transaction and data structure, the validation of whether the amount of remittance is within a predetermined reference amount of remittance (for example, the minimum amount of investment for each investor and the maximum amount of investment for each investor), and the validation of whether the remittance date is within a predetermined period (for example, a fundraising period). As described above, transactions validated through the validation process are propagated through the network, but invalid transactions may be discarded, for example, at the crowdfunding node 110, the first node to which the transaction is transferred.

Meanwhile, a coin remittance transaction from the investor node 120 to the crowdfunding node 110 may be kept to an unconfirmed state. In other words, this is so because, although the corresponding transaction has been transferred to the network, the transaction has not been written to the ledger called a blockchain. If a new block is generated and connected to the blockchain after the occurrence of the coin remittance transaction, transactions in the generated block (which include the aforementioned coin remittance transaction from the investor node to the crowdfunding node) are approved in the confirmed state on the network.

Nodes on the network may store a temporary list including unconfirmed transactions called a memory pool or transaction pool. By using the pool, the nodes may track those transactions known to the network but not included in a blockchain yet. For example, coins remitted from the investor node 120 to the crowdfunding node 110 are stored in the temporary list comprising unconfirmed transactions while, if a new block is generated, the stored transactions are included in the generated block.

In some embodiments, each block of the blockchain may have a summary of all the transactions contained in the corresponding block by using a Merkle tree.

The blockchain operating machine may generate a new block only for a specific time period and only under specific conditions according to the smart contract. More specifically, the blockchain operating machine may automatically generate a new block for a first period. For example, the first period may range from the time coin funding from investors has started to the time the coin funding ends. For example, the time coin funding from investors starts may be the time at which the initial block is generated.

Also, in some embodiments, the blockchain operating machine may generate a new block if the total amount of funded coins on the transactions stored in the temporary list since the generation of the last block exceeds a predetermined threshold. And, the newly generated block includes the transactions stored in the temporary list. In some embodiments, the predetermined threshold may be smaller than a target amount, and therefore, a plurality of new blocks may be generated during the fundraising period.

In some embodiments, the blockchain operating machine may generate a new block if the number of transactions stored in the temporary list equals a predetermined threshold.

In some embodiments, the crowdfunding node 110 may generate a new block periodically during the first period. In some embodiment, the crowdfunding node 110 may not generate a new block if there is no transaction stored at the time of generating a new block.

Also, the crowdfunding node 110 may include a plurality of transactions stored in the pool in a new block according to their priority. The priority may be determined based on the amount of coin remittance. In some embodiments, as the remittance becomes larger, the priority becomes higher. For example, the transaction between the investor node 120 that has transferred the largest amount of coins and the crowdfunding node 110 may be included in the new block with the highest priority. In other words, when the number of transactions that may be included in a new block is determined in advance, those transactions with high priority may be included or arranged first in the new block.

In some embodiments, each block of a blockchain is allowed to have a summary of all the transactions contained in the corresponding block by using the Merkle tree, and thereby whether a specific transaction is included in the block may be checked quickly. Also, the blockchain operating machine of each node may identify the order of including a transaction into the block through the Merkle root.

Also, after generating a new block, the blockchain operating machine may calculate the total amount of coins by referencing the transactions of all of the currently generated new blocks by starting from the block next to the initial block. And, the blockchain operating machine may determine whether the total amount of coins calculated exceeds a target amount. If the total amount of coins calculated does not exceed the target amount, the blockchain operating machine may generate a new block during a second period. For instance, the second period may be an additional fundraising period due to insufficient collection of funds below the target amount within the fundraising period. The blockchain operating machine may generate a new block in the same way as the operation scheme during the first period and store transaction records into the block.

The blockchain operating machine generating a new block may be executed by the software installed in the crowdfunding node 110. The crowdfunding node 110 generates a new block and updates a blockchain by connecting the new block to the initial block.

Other nodes have a local copy of the blockchain starting from the initial block. After receiving the newly generated blocks from the crowdfunding node 110, other nodes connect the new blocks to the existing blockchain.

The blockchain operating machine may automatically generate a new block according to a smart contract during a third period. For example, the third period may correspond to the period from the end of the first period to the completion of game production. Alternatively, the third period may correspond to the period from the end of the second period to the completion of game production.

The crowdfunding node 110 may check the step-by-step contract details of a game developer and transfer coins reflecting the amount due to the contract details at the respective steps to the developer node 130. In other words, the crowdfunding node 110 distinguishes and verifies the respective steps for completing the whole project of game development. And, creation of a transaction for transferring at least part of funds to the developer node 130 is determined according to whether contract details at the respective steps are fulfilled. Therefore, this operation may ensure appropriateness and transparency of the use of collected funds.

Transaction records due to transfer of coins are propagated to all of the nodes participating in the network (520). And, in the occurrence of the propagation of the transaction records during the third period, the blockchain operating machine of predetermined nodes may execute an online voting application according to a smart contract. For example, the predetermined nodes may be investor nodes 120.

According to the online voting result, creation of a new block is determined. In other words, the final approval of a transaction, which describes remittance of at least part of collected funds from the crowdfunding node 110 to the developer node 130, depends on the online voting result. If the transaction is agreed with more than a predetermined portion or number of participants from the online voting, a new block is generated, and the transaction details are included in the new block (530). Therefore, as the transaction is finally approved, the owner of the transferred coins is changed to the developer node 130.

In some embodiments, the predetermined nodes may be all of the nodes participating in the network. In some embodiments, the possibility of participating in the online voting may be in proportion to the amount of funds. In other words, the online voting only with investors who have funded more than a particular amount of coins may reach a consensus quickly. Therefore, the predetermined nodes may be limited to those that have remitted more than a predetermined amount of coins as funds.

For illustration purposes only, it is assumed that the predetermined nodes are investor nodes 120. Then investors may vote for approval of a transaction related to remittance of coins from the crowdfunding node 110 to the developer node 130 by executing an online voting application. All of the nodes executing the online voting application may share their voting result with each other. If more than a predetermined number of voting members approve the transaction from the online voting result, a new block may be generated according to the smart contract. For example, after the approval of the transaction is confirmed, the crowdfunding node 110 may generate a new block. In some embodiments, information about the nodes that have participated in the voting and the corresponding transaction records may be included within the newly generated block.

The crowdfunding node 110 may connect the newly generated block to the blockchain, and other nodes may download the new block through the synchronization of the blockchain and connect the new block to the existing blockchain (540).

In some embodiments, the new block generated during the third period may further include transaction details for remitting the verification fee to the crowdfunding node 110 in addition to the transaction details due to remittance of coins from the crowdfunding node 110 to the developer node 130.

More specifically, the crowdfunding node 110 may receive coins amounting to the verification fee applied according to the stepwise contract details. The crowdfunding node 110 may have a first wallet application for storing coins remitted from the investor node 120, and a second wallet application for storing coins corresponding to the verification fee. And, the remittance addresses of the first and second wallet applications are different from each other. Therefore, the coins remitted from the investor node 120 and the coins corresponding to the verification fee may be stored in the respective wallet applications. The crowdfunding node 110 may generate a transaction which instructs payment of the verification fee to the node having the remittance address information of the second wallet application, namely the crowdfunding node itself. And a new block, which includes transaction details due to remittance of coins corresponding to the verification fee and transaction details due to remittance of coins to the developer node 130, may be connected to the existing blockchain.

After completing game production, the developer may service the produced game. The produced game may be serviced on the platform provided by the crowdfunding node 110. Here, the service is a concept including a service which allows multiple game users to access the crowdfunding node 110 and play or watch the game and an advertisement service about the produced game.

The blockchain operating machine may monitor sales information related to the game service on the crowdfunding node 110. In some embodiments, the crowdfunding node 110 may calculate the net profit from the sales information related to the game service and convert the net profit to the amount of coins. The crowdfunding node 110 may convert the net profit to the amount of coins through a currency converter application. Therefore, the net profit may be calculated as the amount of coins in terms of the current coin price by reflecting the change in the value of the coin.

The crowdfunding node 110 may generate a transaction for distributing profits among all of the nodes according to the smart contract if a predetermined amount of sales is occurred during a fourth period (for example, a period after the end of the third period).

For example, the crowdfunding node 110 may generate a transaction for remitting coins corresponding to part of profits to the developer node 130. In some embodiments, the crowdfunding node 110 may generate a transaction for remitting coins corresponding to part of profits to the investor nodes 120. In some embodiments, the crowdfunding node 110 may generate a transaction for remitting coins corresponding to part of profits based on the ratio determined according to the amount of funds collected from the respective investor nodes 120. In some embodiments, the crowdfunding node 110 may generate a transaction for remitting coins corresponding to the verification fee due to a game advertisement service to its node 110. In some embodiments, the crowdfunding node 110 may generate a transaction for remitting coins corresponding to part of profits from a node generating a new block to the node itself (the node that generates the new block) on behalf of the node.

The blockchain operating machine of the crowdfunding node 110 may configure a probability value for block generation rights according to the smart contract if a transaction occurs during the fourth period. And, the blockchain operating machine adjusts the configured probability value for block generation rights according to the smart contract and assigns block generation rights to the node selected based on the adjusted probability value. For example, the developer node 130 has a first probability value for block generation rights, the crowdfunding node 110 has a second probability value for block generation rights, and the investor node 120 has a third probability value for block generation rights. The probability of having new block generation rights may become higher as the probability value for block generation rights becomes larger. The first probability value for block generation rights may be adjusted based on the profits due to the game service. The second probability value for block generation rights may be adjusted according to the amount of game advertisement service activities. Therefore, operators of the game advertisement service are encouraged to do advertisements actively. And, the third probability value for block generation rights may be adjusted according to the amount of investment. In other words, as the amount of investment is larger, the probability of having the block generation rights is likely to be increased, which leads to encouragement of more active investment. In some embodiments, the third probability value for block generation rights may be adjusted according to the investment time point. The blockchain operating machine may identify the investment time point by checking the order of blocks within a blockchain and the time at which a particular transaction is included in a specific block from the Merkle root. For example, taking into account the fact that investors participating in the funding process which has already collected large investment funds and investors participating in the funding process which has not collected considerable investment funds yet (for example, right after the funding initiation) may have different risks, the probability value may be increased as the investment is made earlier. In some embodiments, the third probability value for block generation rights may be adjusted according to participation in the online voting. Nodes which have participated in the online voting may be determined from the data records within the block. And, by increasing the probability of assigning block generation rights to the node which has participated in the online voting, active participation in the online voting may be encouraged.

The node granted a block generation right may generate a new block. The transaction generated by the crowdfunding node 110 may be included in the newly generated block. The generated block is connected to the existing blockchain and is propagated to other nodes. Also, the transaction generated by the crowdfunding node 110 may include a transaction through which the node generating a new block remits coins corresponding to part of profits to its node (the node generating a new block). Therefore, the node granted the block generation rights may receive additional profits in addition to the predetermined distribution of profits. In another embodiment, a special transaction may be generated. The special transaction may be configured by the node generating a new block and is a kind of compensation for block generation. In other words, the node which generates a new block may generate a transaction based on a concept of coins paid by the wallet of its own node. And, if a new block is generated, the special transaction may be included in the new block.

In another embodiment, among those nodes participating in the network for each round, a plurality of nodes may be promoted to producer nodes to generate a block.

More specifically, a round may be initiated from a predetermined time point. A plurality of rounds may be defined. In the N-th round (N is a positive integer), a plurality of promotable nodes may be selected, the nodes having probability values larger than a predetermined threshold according to the probability values for block generation rights of the respective nodes configured before the initiation of the N-th round ((N−1)-th round or before the initiation of the round in the case of the first round). And, the node designated as a producer node may maintain the position of the producer node during a permitted period within one round. Promotable nodes may be promoted to producer nodes according to a predetermined order. For example, the first to n promotable nodes may be promoted to producer nodes at the start of their permitted period according to a predetermined order. Therefore, the second node may be promoted after the first node is promoted, and then the third node may be promoted. The nodes promoted in a specific round may lose their promoted position at the same time once the corresponding round is completed. In some embodiments, nodes may be promoted at regular intervals, but the present disclosure is not limited to the specific operation.

A plurality of permitted periods may be defined for each round. At the start of the permitted period, promotable nodes may be promoted to producer nodes, and the position of the producer node is maintained until the end of the permitted period. For instance, the end time of the permitted period may coincide with the end time of the corresponding round. The start time of each permitted period of the nodes that may be promoted to producer nodes may be different from each other. Therefore, duration of the position of the producer node for each round may differ between the producer nodes.

Also, the promotable state of the promotable nodes designated before initiation of the N-th round may be maintained until the (N+M)-th round (N and M are positive integers). Therefore, before the (N+M+1)-th round is initiated, promotable nodes may be designated again based on the probability value for block generation rights described above. And in the next round, the (N+1)-th round, a node next to the last promoted node of the N-th round may be the first producer node.

Alternatively, a node next to the producer node which has generated a candidate block confirmed as an approved block in the N-th round or the producer node may be the first promotable node of the (N+1)-th round. In other words, a node next to the producer node which has generated an approved block of a previous round becomes the first producer node of the next round. This scheme makes it difficult to predict a node to be promoted in the next round, thereby improving system security.

Meanwhile, each block header of candidate blocks generated by a producer node may include voting information of a previous block. In other words, the voting information related to the previous block, by which it may be checked that the previous block has obtained more than a predetermined number of votes and has been finally approved, may be included in the block header of a current block. Therefore, each block connected to a blockchain may include the voting information of the previous block.

Also, the number of producer nodes having block generation rights for each round may be increased in the corresponding round as time elapses. Therefore, for those blocks generated by at least part of a plurality of producer nodes, a consensus may be made so that the blocks compete with each other and a block selected as a sole candidate is updated in the blockchain.

More specifically, among a plurality of nodes that are able to be promoted to producer nodes granted a block generation right at a predetermine time point for each round, a first node may receive a candidate block in the N-th round, determine whether the received candidate block is a valid candidate block, determine whether the valid candidate block is an unapproved block, determine whether the unapproved block is the first received candidate block, and determines whether to vote for approval of the unapproved block. And, the first received candidate block may be the candidate block that the first node has received initially in the N-th round.

Also, the node may propagate the first received candidate block and voting information about the block to other nodes.

Also, among unapproved blocks generated in the N-th round, those unapproved blocks for which the number of votes is larger than a predetermined value may be accepted as approved blocks.

Also, all of the nodes promoted to producer nodes in the N-th round may lose their producer node position before the (N+1)-th round or after the N-th round, and a node next to the node which has generated the candidate block accepted as the approved block in the N-th round may be promoted as the first producer node in the (N+1)-th round.

Also, among a plurality of unapproved blocks, in the absence of an unapproved block for which the number of votes is larger than a predetermined value (for example, an unapproved block which has obtained more than two-thirds (⅔) of votes from nodes eligible for voting), a revote round may be initiated, and during the revote round, a revote for the plurality of unapproved blocks may be performed according to a predetermined priority. During the revote round, generation of a new candidate block may be stopped. And, if the revote round is terminated, the next round may be initiated.

Also, while the revote is in progress, a plurality of nodes eligible for voting may perform a revote for approval of unapproved blocks which have obtained more than a predetermined number of votes among the plurality of unapproved blocks. Alternatively, while the revote is in progress, a plurality of nodes eligible for voting may perform a revote for approval of an unapproved block which has obtained the largest number of votes among the plurality of unapproved blocks.

Also, while the revote is in progress, in the presence of a plurality of unapproved blocks which have obtained more than a predetermined number of votes among the plurality of unapproved blocks, a revote may be performed for approval of an unapproved block generated by the node which has first been promoted among the nodes generated the plurality of unapproved blocks respectively. The first promotion node is a node having the highest promotion order to the producer node in the N-th round. While the revote is in progress, in the absence of a plurality of unapproved blocks which have obtained more than a predetermined number of votes among the plurality of unapproved blocks, a revote may be performed for approval of an unapproved block generated by the first promotion node among the nodes which have generated the plurality of unapproved blocks respectively.

Also, when validity of the candidate block is determined, whether the node which has generated the received candidate block has been promoted is determined, and if the received candidate block is the block that the promoted node has generated, the received candidate block may be accepted as a valid candidate block. On the other hand, if the received candidate block is not a valid candidate block, the received candidate block may be discarded.

Also, when it is determined that the valid candidate block is an unapproved block, existence of the next block which includes a voting result larger than a predetermined threshold for the valid candidate block is determined, the valid candidate block is accepted as an approved block in the presence of the next block, and synchronization of the approved block may be requested to the distributed network. In other words, the received valid candidate block is not a candidate block agreed on in the present round but an approved block agreed on previously, for which synchronization has to be completed already.

Also, among the plurality of nodes that can be promoted to producer nodes granted a block generation right at a predetermine time point for each round, a second node may be promoted in the N-th round, determine whether a candidate block before promotion is received in the N-th round, generate a candidate block including voting information in the last block on the blockchain to which a new block is to be connected if the candidate block before promotion is not received, vote for the generated candidate block, and transfer the candidate block and voting information to other nodes. The new block becomes an approved block that is approved in the N-th round. If a node promoted to a producer node has already received a candidate block before promotion, a new candidate block is not generated.

In another aspect, the second node promoted in the N-th round may receive a candidate block generated by another node, determine whether the received candidate block is a valid candidate block, determine whether the valid candidate block is an unapproved block, and transfer the unapproved block to other nodes. And, if the received candidate block is not a valid candidate block, the received candidate block is discarded. And, if the valid candidate block is not an unapproved block, the valid candidate block is accepted as an approved block agreed on previously and is updated in the blockchain of the node itself through blockchain synchronization.

Meanwhile, nodes may propagate a candidate block, approved block, voting information, and revote information received from other nodes through the network. Also, nodes may propagate a generated candidate block, approved block, and generated voting information, and revote information on the network. And, a node promoted to a producer node may generate a candidate block only once in the round at the time of promotion. Also, the voting right of a node may be limited to one-time voting. Also, each time a revote is initiated, a voting right for only one-time is obtained in the revote round. Therefore, multiple voting or voting for two or more candidate blocks may be prohibited. Also, among candidate blocks, a candidate block which has obtained votes from more than a predetermined number (e.g. ⅔) of the number of nodes eligible for approval voting may be agreed on as an approved block. Also, at the time of generating a candidate block, collected transactions are included in the candidate block.

Some embodiments of the present disclosure may be implemented in the form of program commands which may be executed through various types of computer elements and recorded in a computer-readable recording medium. The computer-readable recording medium may include program commands, data files, and data structures separately or in combination thereof. The program commands recorded in the computer-readable recording medium may be designed and composed specifically for the present invention or may be commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present invention, and vice versa.

Specific implementation of the present invention are embodiments, which does not limit the technical scope of the present invention in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present invention.

Also, although detailed descriptions of the present invention have been given with reference to preferred embodiments of the present invention, it should be understood by those skilled in the corresponding technical field or by those having common knowledge in the corresponding technical field that the present invention may be modified and changed in various ways without departing from the technical principles and scope specified in the appended claims. Therefore, the technical scope of the present invention is not limited to the specifications provided in the detailed descriptions of this document but has to be defined by the appended claims.

An embodiment of the present invention may provide a method and a system for ensuring reliability, appropriateness, and transparency in using funded money.

Also, an embodiment of the present invention may ensure appropriateness and transparency of distribution of profits obtained from game services.

Also, an embodiment of the present invention may efficiently operate a crowdfunding service by automatically executing a contract according to a smart contract without having to check intervention of a third party according to contract conditions or fulfillment of the contract conditions.

Also, an embodiment of the present invention may resolve or minimize various problems or limitations encountered from an offline or some online crowdfunding services.

Also, an embodiment of the present invention may resolve a unique leader selection problem for each round in the conventional leader model and a problem when the selected leader is a malicious leader; resolve a problem that a blockchain system is halted when a producer node neglects to generate blocks by using a method for generating a producer node during a permitted period for each round; and prevent a large amount of block generators from being existed.

The technical effects of the present invention are not limited to the technical effects described above, and other technical effects not mentioned herein may be understood from the description below.

What is claimed is:
1. A crowdfunding method executed on a distributed network including a plurality of nodes, the method comprising:
performing, by the distributed network including the plurality of nodes, a crowdfunding service based on a blockchain for producing a game according to a configured smart contract,
wherein the plurality of nodes programmed to perform the crowdfunding service in a form of the blockchain include a crowdfunding node, an investor node, and a developer node,
wherein the smart contract comprises:
generating an initial block of the blockchain, wherein the initial block includes data records related to game production plan information of the game and the blockchain is stored in at least one of the plurality of nodes of the distributed network,
sharing one or more transaction records, related to electronic transactions of coins of the blockchain associated with the game, with the plurality of nodes,
generating at least one new block including data records related to the one or more transaction records associated with the game, and
updating the blockchain to add the at least one new block to the blockchain comprising the initial block, including the data records related to the game production plan information, through communication with the distributed network,
wherein the one or more transaction records comprise a first transaction record about transfer of the coins of the blockchain for funding from the investor node to the crowdfunding node, a second transaction record about first remittance of the coins of the blockchain from the crowdfunding node to the developer node for fulfilling one or more of step-by-step contract conditions of game development included in the game production plan information of the initial block of the blockchain, and a third transaction record about second remittance of the coins of the blockchain from the crowdfunding node to the developer node and/or the investor node for distributing profits from service of the game, and
wherein each of the developer node, the crowdfunding node and the investor node is sequentially configured to a first probability value, a second probability value and a third probability value for block generation rights and one of the developer node, the crowdfunding node and the investor node selected by the largest value among the first probability value, the second probability value and the third probability value generates a new block.

2. The method of claim 1, wherein the game production plan information includes at least one of game concept information, fundraising plan information, use plan information of raised funds, and step-by-step contract information received from a game producer via a webpage provided by the crowdfunding node of the plurality of nodes.

3. The method of claim 2, wherein the crowdfunding node generates a crowdfunding game promotion page based on the game production plan information, and provides access to the crowdfunding game promotion page to one or more nodes connected to the crowdfunding node among the plurality of nodes.

4. The method of claim 1, wherein one node of the plurality of nodes which has received the first transaction records validates the received first transaction records, shares the received first transaction records with other nodes when the received first transaction records are validated, and discards the received first transaction records when the received transaction records are not validated, wherein validation of the received first transaction records includes at least one of validation of syntax of a transaction and data structure, validation of whether a minimum amount of investment is satisfied for each investor, validation of whether an amount of investment of each investor is less than a maximum amount of investment, and validation of whether a remittance date is within a fundraising period.

5. The method of claim 1, wherein the smart contract determines priority of the first transaction records based on an amount of remittance of coins of the blockchain within the first transaction records shared with the plurality of nodes and includes a transaction record having a highest priority among the first transaction records in the new block.

6. The method of claim 1, wherein the first to third transaction records are generated at different time periods not overlapped with each other.

7. The method of claim 1, wherein the smart contract is configured based on the game production plan information.

8. The method of claim 1, wherein the smart contract determines time for generating the new block based on at least one of the number of the one or more transaction records, an amount of coins of the blockchain on the one or more transaction records, and time of generating the one or more transaction records.

9. The method of claim 1, wherein the game production plan information includes information related to the step-by-step contract conditions, and the smart contract determines whether to generate the new block based on whether the step-by-step contract conditions are fulfilled at respective steps.

10. The method of claim 9, wherein: the smart contract determines whether to generate the new block including a transaction record where at least part of coins of the blockchain received from the investor node by a crowdfunding is transferred to the developer node based on execution of the step-by-step contract conditions.

11. The method of claim 9, wherein the smart contract includes:
collecting online voting results from predetermined nodes among the plurality of nodes, and
determining whether to execute the step-by-step contract conditions based on the collected online voting results.

12. The method of claim 11, wherein the predetermined nodes are nodes which have funded coins of the blockchain more than a preconfigured amount.

13. The method of claim 1, wherein the smart contract generates a new transaction record based on at least one of sales information associated with a service of the game, advertisement information associated with a game service, information about an amount of coins of the blockchain on a transaction record between the crowdfunding node and the investor node, and time of generating the transaction record between the crowdfunding node and the investor node.

14. The method of claim 13, wherein the new transaction record includes at least one of at least one transaction record about remittance of coins of the blockchain to the developer node, at least one transaction record about remittance of coins of the blockchain to the investor node, and at least one transaction record about remittance of coins of the blockchain to the crowdfunding node.

15. The method of claim 1, wherein the smart contract determines a node to be granted a right for generating the new block to include the transaction record based on sales information associated with the service of the game, advertisement information associated with a game service, information about an amount of coins of the blockchain on a transaction record between the crowdfunding node and the investor node, time of generating the transaction record between the crowdfunding node and the investor node, and information about nodes which have participated in online voting.

16. The method of claim 1, wherein the first probability value is adjusted based on the profits due to the game service, the second probability value is adjusted according to the amount of game advertisement service activities and the third probability value is adjusted according to the amount of investment.

17. A non-transitory computer readable storage medium comprising at least one program for execution by a processor, the at least one program including instructions which, when executed by the processor, cause the processor to perform operations comprising:
performing, by a distributed network including a plurality of nodes, a crowdfunding service based on a blockchain for producing a game according to a configured smart contract,
wherein the plurality of nodes programmed to perform the crowdfunding service in a form of the blockchain include a crowdfunding node, an investor node, and a developer node,
wherein the smart contract comprises:
generating an initial block of the blockchain, wherein the initial block includes data records related to game production plan information of the game and the blockchain is stored in at least one of the plurality of nodes of the distributed network,
sharing one or more transaction records, related to electronic transactions of coins of the blockchain associated with the game, with the plurality of nodes,
generating at least one new block including data records related to the one or more transaction records associated with the game, and
updating the blockchain to add the at least one new block to the blockchain comprising the initial block, including the data records related to the game production plan information, through communication with the distributed network, and
wherein the one or more transaction records comprise a first transaction record about transfer of the coins of the blockchain for funding from the investor node to the crowdfunding node, a second transaction record about first remittance of the coins of the blockchain from the crowdfunding node to the developer node for fulfilling one or more of step-by-step contract conditions of game development included in the game production plan information of the initial block of the blockchain, and a third transaction record about second remittance of the coins of the blockchain from the crowdfunding node to the developer node and/or the investor node for distributing profits from service of the game, and
wherein each of the developer node, the crowdfunding node and the investor node is sequentially configured to a first probability value, a second probability value and a third probability value for block generation rights and one of the developer node, the crowdfunding node and the investor node selected by the largest value among the first probability value, the second probability value and the third probability value generates a new block.

18. The non-transitory computer readable storage medium of claim 17, wherein a node, which has received transaction records, validates the received transaction records, shares the received transaction records with other nodes when the received transaction records are validated, discards the received transaction records when the received transaction records are not validated, where validation of transaction records includes at least one of validation of syntax of a transaction and data structure, validation of whether an amount of remittance is within a predetermined reference amount of remittance, and validation of whether a remittance date is within a predetermined period.

* * * * *